Patented May 30, 1950

2,510,035

UNITED STATES PATENT OFFICE 2,510,035

HALOGEN-CONTAINING POLYMERIC SUBSTANCES OF IMPROVED HEAT AND LIGHT STABILITY AND STABILIZERS THEREFOR

Gerry P. Mack, Jackson Heights, N. Y., assignor to Advance Solvents & Chemical Corporation, New York, N. Y., a corporation of New York No Drawing. Application April 12, 1946, Serial No. 661,888

17 Claims. (Cl. 260—45.85)

The present invention relates to halogen-containing polymeric substances of improved heat and light stability and stabilizers therefor.

Although not limited thereto, the present invention will be particularly described in its application to vinyl or similar polymers derived from vinyl chloride, vinyl chloracetate, vinylidene chloride, chlorstyrene or chlorbutadiene. The present invention is also applicable to resins derived from non-chlorinated or non-halogenated vinyl acetate or other fatty acid esters, methyl or other alkyl acrylates, ethylene or its homologues or polymers, butadiene or its homologues or polymers and styrene or its homologues or polymers, which are after-halogenated or after-chlorinated or which are co-polymerized with chlorinated or halogenated unsaturated hydrocarbons or their compounds.

It has been found that chlorine or halogen-containing polymeric resins containing more than 5% chlorine or halogen tend to acquire an instability toward heat and light. They decompose frequently upon being heated, incidental to their formation and fabrication, with development of a yellowish color which may deepen and pass through various shades of tan to brown and finally to black.

If the discoloration is due to the liberation of hydrogen halide or hydrogen chloride, which free compound catalyzes further decomposition, the addition of basic compounds to neutralize the hydrogen chloride or form inert compounds therewith should retard such discoloration and darkening. However, many basic compounds are quite unsatisfactory and others do not give the desired results or permit substantial darkening of the resin.

For example, (a) lead, cadmium, manganese and calcium salts of high molecular weight, fatty acids, such as oleic, lauric, and palmitic; (b) lead and cadmium salts of lower molecular fatty acids, such as the acetates; (c) organic and inorganic bases, such as hydroxylamine and hexamethylene tetramine; (d) alcoholates of alkali earth metals, such as calcium 2-ethyl hexylate; and (e) calcium and cadmium salts of hexoic acids, when both an alkyl group or an ethyl group and a phenyl group are directly attached to the alpha carbon atom, such as calcium phenylethylhexoate, cadmium phenylethylhexoate and lead phenylethylhexoate, will permit substantial yellowing or darkening. The same is also true of cadmium salts of hexoic acid where an ethyl group only is attached to the alpha carbon atom. In general lead and cadmium salts are unsatisfactory and the same is true of alkali metal salts. Calcium, strontium and barium salts of straight chain unbranched acids or where the branched acid has a phenyl or aryl group attached directly to the alpha carbon atom are also not entirely satisfactory.

The same difficulty has also been experienced with organo-lead and tin compounds, such as (f) propyl, butyl or phenyl lead and tin oxides or hydroxides; tetra-ethyl or tetra-butyl tin compounds; (g) tetra-phenyl or propyl tri-phenyl lead and tin compounds; and (h) dibutyl, tributyl and diphenyl tin acetates; oleates, laurates or stearates. Although these materials are useful in stabilizing halogen-containing vinyl resins, nevertheless they do not prevent development of yellow color and eventual darkening or blackening of the resins, and furthermore they frequently result in development of a haze in heat pressed sheets and do not produce a high degree of clarity.

It is among the objects of the present invention to provide novel halogen-containing vinyl resins, which are stabilized against heat and light discoloration, resulting either in processing and forming operations, or upon exposure over a long period of time to high room temperatures or to normal elevated temperatures in the tropics or semi-tropics or even occurring in summer in the temperate zone.

Another object is to provide improved heat and light stabilizers for halogen-containing vinyl resins which will be readily soluble in the resin composition at all stages during its processing and formation and which will be highly effective against development of discoloration or haze in the resins, the resins retaining their clarity and water-white appearance over prolonged periods.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has been found that the above objects may be accomplished by adding small amounts of the alkali earth metal salts of alpha- and beta-substituted aliphatic carboxylic acids to the halogen-containing vinyl resins in amounts less than 10% and desirably from 0.5% to 6.0%.

The preferred alkali earth metal salts are the calcium, barium and strontium salts of the following groups of aliphatic carboxylic acids containing 4 to 16 carbon atoms.

(a) Aliphatic carboxylic acids, having alkyl substitution groups either in the alpha or beta position, such as 2-ethyl butyric acid
2-methyl octoic acid
2-methyl pentanoic acid
2-methyl ethyl acetic acid
Di-n-heptyl acetic acid
2-methyl decoic acid
3-methyl decoic acid
2-methyl pentadecoic acid
2-ethyl myristic acid (b) Aliphatic carboxylic acids, having alkyl substitution groups, preferably in the alpha and beta position. If more than one substituent group is present, at least one should be in the alpha or beta position, such as 2,3-dimethyl butanoic acid
2-methyl, 5-ethyl pelargonic acid (c) Aliphatic carboxylic acids having 2 or 3 alkyl substituent groups on the alpha or beta carbon atom, such as 2,2-dimethyl butanoic acid
Trimethylacetic acid (d) Aliphatic carboxylic acids having an aryl group connected to the alpha or beta carbon atom by at least one $CH_2$ group, such as Benzyl acetic acid (beta-phenyl propionic acid)
Dibenzyl acetic acid (e) Aliphatic carboxylic acids having alkoxy groups, 3,5-diethoxy hexoic acid
3-ethoxy butyric acid
2-methoxy lauric acid (f) Branched chain aliphatic carboxylic acids having a double bond between the alpha and beta carbon atoms, such as 3-methyl amyl acrylic acid
2,2-dimethylacrylic acid
Methacrylic acid (g) Aliphatic carboxylic acids having one or more hydroxyl groups, preferably in the alpha or beta position, such as 3 hydroxy butyric acid.

Zinc, lead and cadmium salts are not satisfactory since they accelerate decomposition of vinyl halide resins unless they are used with the above alkali earth metal salts.

The preferred acids have from 4 to 16 carbon atoms and they preferably do not contain more than 14 carbon atoms in any one straight chain. For example, calcium stearate or oleate are not effective stabilizers since they have poor solubility in, and compatibility with, the resins, tend to sweat out and give opaque films. In any case, they do not prevent development of a yellow color.

The preferred salts have the general formula

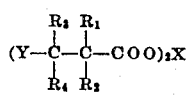

X is an alkali earth metal. At least one, but preferably more, of the $R_1$, $R_2$, $R_3$, and $R_4$ groups must be alkyl groups, such as methyl, ethyl, propyl, butyl, amyl, hexyl, heptyl, or octyl, or alicyclic groups, such as cyclohexyl, hexahydrobenzyl or cyclopentyl, or alkoxy groups, such as methoxy, ethoxy, butoxy, pentoxy or hexoxy. One of the four substituents $R_1$, $R_2$, $R_3$, and $R_4$ may be hydroxyl. Only $R_3$ and/or $R_4$ of the substituents may be phenyl, toluyl, napthyl, in which case $R_1$ and $R_2$ must be hydrogen, since aryl groups attached directly to the alpha carbon atom cause yellowing of the baked resin. $R_1$ and $R_2$, may be benzyl. Y is the balance of the aliphatic chain and may contain from one to 14 carbon atoms.

The preferred compounds above listed are highly compatible and soluble in vinyl halogen resins and in organic solvents therefor, such as ketones and alcohols, and they may be used in vinyl lacquers, films, fibers, and generally in vinyl materials produced by mill and calender processes, produced or spun out of solutions and so forth.

As specific examples, the following may be given:

Example 1

To 100 grams of a 10% polyvinyl chloride acetate resin (with 92%–95% polyvinyl chloride content) solution in ethyl methyl ketone, 0.1 gram of barium 2-ethylhexoate is added. A very slightly hazy solution is formed. From this solution films are poured, which after air drying and further drying at 105° C. until all the solvent is evaporated, are baked at 165° C. for 30 minutes. A polyvinyl chloride acetate film containing no stabilizer was also baked at the same time. No discoloration takes place in the film containing the stabilizer. The film containing no stabilizer is colored deep brown.

Example 2

In 100 grams of a 10% polyvinyl chloride acetate copolymer solution, 0.2 gram of strontium 2-methyl octoate are dissolved. A clear solution results. The films poured from this solution are dried and then baked at 165° C. for 35 minutes and no discoloration takes place.

Example 3

100 parts of polyvinyl chloride acetate copolymer and 50 parts dioctyl phthalate as a plasticizer are mixed intimately on a rubber mill (at 260° F.) with 5 parts of calcium 2-ethyl butyrate. Films made from this mixture are heated at 165° C. for 30 minutes and no discoloration is observed with stabilized films. Unstabilized films so treated discolor to a brownish color.

Example 4

0.15 parts by weight of strontium diheptyl acetate are dissolved in 100 parts of a 10% polyvinyl chloride acetate copolymer resin solution forming a clear solution. The films are baked at 165° C. for 30 minutes and show only a very slight yellowish tint. Unstabilized films so treated give a muddy brown color.

Example 5

0.1 part of barium trimethyl acetate is milled in 100 parts of 10% polyvinyl chloride acetate copolymer solution in a color grinder until a uniform stable dispersion results. The films baked at 165° C. for 35 minutes show excellent stability against discoloration.

Example 6

0.1 part of strontium methyl ethyl acetate is added to the resin solution of Example 1 until a uniform dispersion is formed. The films when baked at 165° C. show no discoloration.

Example 7

0.3 gram strontium-3,5-diethoxy hexoate are dissolved in 100 grams of a 10% polyvinyl chloride-acetate copolymer solution. The dried film poured from this solution shows no discoloration after baking at 165° C. for 30 minutes.

Example 8

0.1 gram strontium dibenzyl acetate are dissolved in 100 grams of a 10% solution of the vinyl-chloride-acetate resin, containing approximately 90% vinylchloride. Films are poured which are dried and baked for 30 minutes at 165° C. There is only a very slight yellowish discoloration.

Example 9

0.1 part of calcium amyl acrylate is dissolved in 100 parts of a 10% solution of the vinylchloride-acetate resin, containing approximately 90% vinylchloride. The films are baked at 165° C. for 35 minutes after drying and they show no discoloration.

Example 10

0.1 part of strontium methacrylate is finely dispersed in 100 parts of a 10% solution of the vinylchloride-acetate resin, containing approximately 90% vinylchloride. The films on baking show practically no discoloration.

Example 11

100 parts of polyvinyl chloride acetate copolymer and 50 parts dioctyl phthalate as a plasticizer are mixed intimately on a rubber mill (at 260° F.) with 2 parts of barium-3-hydroxy butyric acid. Films made from this mixture are heated at 165° C. for 30 minutes and no discoloration is observed with stabilized films. Unstabilized films so treated discolor to a brownish color.

The above stabilizers have excellent light resistance. For instance, a sample was milled and sheeted cut, having the following composition:

100.00 parts of a copolymer of vinyl chloride and vinylidene chloride
46.60 parts dioctyl phthalate
0.60 part strontium-2-ethyl hexoate This sheet was then placed in an Atlas Fadeometer and exposed to the light at a temperature of 140° F. The above sample was still in excellent condition at the end of 120 hours without any discoloration. The same sample, but without stabilizer, turned brown at the end of 48 hours. Similar results were obtained with various other commercial polymers of vinyl chloride and its copolymers.

In combination with the above resins and the alkali earth metal branched chain aliphatic carboxylic acid salt, there may be employed:

(a) Pigments such as titanium dioxide, barium sulphate, whiting, fine ground hard clay, basic lead carbonate and lead titanate, (b) Waxes, such as octadecyclic acid amide and cetyl acetamide.

(c) Lubricants such as hydrogenated castor oil, barium stearate, calcium stearate and stearic acid.

(d) Plasticizers, such as

Dioctyl phthalate
Tricresyl phosphate
Tributyl citrate
Methoxy ethyl acetyl ricinoleate
Dibutoxy ethyl phthalate
Triethylene glycol diethyl hexoate
Trioctyl phosphate The preferred resins stabilized according to the present invention are those formed by the conjoint polymerization of vinyl chloride with vinyl esters of aliphatic acids or with other unsaturated polymerizable compounds. In general, the invention is applicable to resins produced from or by (1) the polyvinyl halides, such as for example polyvinyl chloride or polyvinyl bromide; (2) the conjoint polymerization of vinyl halides and vinyl esters of the lower aliphatic acids, such as the copolymers of vinyl chloride with vinyl acetate, vinyl propionate, vinyl butyrate, vinyl chloracetate and vinyl chlorpropionate; (3) the conjoint polymerization of vinyl halides and an acrylic compound, such as the copolymers of vinyl chloride with ethyl methacrylate, methyl methacrylate, methyl acrylate, methyl ethacrylate, benzyl acrylate, chlorbenzyl acrylate, and methyl chloracrylate; and (4) the joint polymerization of three component systems, such as vinyl chloride, vinyl acetate and ethyl methacrylate. Other multi-component copolymers may be used, the only requirement being that at least one of the components is a vinyl halide.

Generally the instability of these vinyl resins increases as the amount of halogen or chlorine is increased above 5% particularly when heated during their formation and fabrication.

To give some typical chlorine or halogen contents of resins to which this invention is applicable:

| Resin | Weight per cent of chlorine |
|---|---|
| Polyvinyl chloride | 57 |
| Polyvinyl chloride-acetate copolymers (range 65/35 to 95/5) | 31-50 |
| Polyvinylidene Chloride | 73 |
| Chlorinated rubbers | 45-55 |
| Polychloroprene | 40 |
| Polymethyl, alpha-chloro acrylate | 34 |

By the expressions "low alkyl group" and "low alkoxy group" used in the specification and accompanying claims is included alkyl groups having from 1 to 6 carbon atoms.

The stabilizer of the present invention is useful not only for producing articles by the so-called mill and calender process but also from solvents or organo-sols. Such stabilizers are also very useful for production of vinyl lacquers and also for vinyl fibers which are usually produced or spun out of solutions.

As many changes could be made in the above stabilized halogen-containing polymeric resins and the non-soapy alkali earth metal salts of branched chain aliphatic carboxylic acids as stabilizers therefor, and many widely varying embodiments of this invention could be made without departing from the scope of the claims, it is intended that all matter contained in the above description shall be interpreted as illustrative and not in a limiting sense.

What is claimed is:

1. A heat and light stabilized resin containing polyvinyl chloride, resistant to yellowing and darkening when heated during formation and upon fabrication, including as a stabilizer, a small percentage of an alkali earth metal salt of a substituted chain, aliphatic carboxylic acid, containing from 4 to 16 carbon atoms, the alpha carbon atom being free of a directly attached aryl group.

2. A heat and light stabilized resin containing polyvinyl chloride, resistant to yellowing and darkening when heated during formation and upon fabrication, including as a stabilizer, a small percentage of an alkali earth metal salt of a branched chain, aliphatic carboxylic acid, containing from 4 to 16 carbon atoms, the alpha carbon atom being free of a directly attached aryl group.

3. A heat and light stabilized resin containing polyvinyl chloride, resistant to yellowing and darkening when heated during formation and upon fabrication, including as a stabilizer, a small percentage of an alkali earth metal salt of a branched chain, aliphatic carboxylic acid, containing from 4 to 16 carbon atoms, with not over 14 carbon atoms in any one continuous chain, the alpha carbon atom being free of a directly attached aryl group.

4. A heat and light stabilized resin containing polyvinyl chloride, resistant to yellowing and darkening when heated during formation and upon fabrication, including as a stabilizer, a small percentage of an alkali earth metal salt of a branched chain, aliphatic carboxylic acid containing from 4 to 16 carbon atoms, the branching of the chain being in alpha position, and the alpha carbon atom being free of a directly attached aryl group.

5. A heat and light stabilized resin containing polyvinyl chloride, resistant to yellowing and darkening when heated during formation and upon fabrication, including as a stabilizer, a small percentage of an alkali earth metal salt of a branched chain, aliphatic carboxylic acid containing from 4 to 16 carbon atoms, the branching of the chain being in beta position and the alpha carbon atom being free of a directly attached aryl group.

6. A heat and light stabilized resin containing polyvinyl chloride, resistant to yellowing and darkening when heated during formation and upon fabrication, including as a stabilizer, a small percentage of an alkali earth metal salt of a branched chain, aliphatic carboxylic acid containing from 4 to 16 carbon atoms and having an alkyl group in the branched chain, the alpha carbon atom being free of a directly attached aryl group.

7. A heat and light stabilized resin containing polyvinyl chloride, resistant to yellowing and darkening when heated during formation and upon fabrication, including as a stabilizer, a small percentage of an alkali earth metal salt of a branched chain, aliphatic carboxylic acid containing from 4 to 16 carbon atoms and having at least one alkoxy group in the branched chain, the alpha carbon atom being free of a directly attached aryl group.

8. A stabilized resin containing polyvinyl chloride, resistant to yellowing and darkening when heated during formation and upon fabrication, including as a stabilizer a small percentage of an alkali earth metal salt of a branched chain, aliphatic carboxylic acid containing from 4 to 16 carbon atoms, having an aryl group removed from the alpha carbon atom by at least one —$CH_2$— group.

9. In a resin containing polyvinyl chloride, to render such resin resistant to yellowing and darkening when heated during formation and upon fabrication, a small amount of a strontium salt of alpha-ethyl hexoic acid.

10. As a stabilizer for a resin containing polyvinyl chloride, to render such resin resistant to yellowing and darkening when heated during formation and upon fabrication, a small percentage of an alkali earth metal salt of an alpha substituted aliphatic carboxylic acid containing from 4 to 16 carbon atoms, the alpha carbon atom being free of a directly attached aryl group.

11. A stabilized polyvinyl chloride-acetate resin, stabilized by 0.5% to 6.0% of an alkali earth metal salt of an alkyl substituted, branched chain fatty acid containing from 4 to 16 carbon atoms, the alpha carbon atom being free of a directly attached aryl group.

12. A stabilized polyvinyl chloride resin, stabilized by 0.5% to 6.0% of an alkali earth metal salt of an alkyl substituted, branched chain fatty acid containing from 4 to 16 carbon atoms, the alpha carbon atom being free of a directly attached aryl group.

13. A stabilized copolymer of vinylidene chloride and vinyl chloride resin, stabilized by 0.5% to 6.0% of an alkali earth metal salt of an alkyl substituted, branched chain fatty acid containing from 4 to 16 carbon atoms, the alpha carbon atom being free of a directly attached aryl group.

14. In stabilized polyvinyl chloride-acetate resin, 0.5% to 6.0% of an alkali earth metal salt of an alkyl hexoic acid, the alpha carbon atom being free of a directly attached aryl group.

15. In a stabilized copolymer of vinylidene chloride and vinyl chloride resin, 0.5% to 6.0% of an alkali earth metal salt of an alkyl hexoic acid, the alpha carbon atom being free of a directly attached aryl group.

16. In a stabilized copolymer of vinylidene chloride and vinyl chloride resin, 0.5% to 6.0% of an alkali earth metal salt of an alkyl substituted, branched chain hexoic acid, the alpha carbon atom being free of a directly attached aryl group.

17. In a stabilized polyvinyl chloride-acetate resin, 0.5% to 6.0% of strontium alpha ethyl hexoate.

GERRY P. MACK.

REFERENCES CITED

The following references are of record in the file of this patent:

UNITED STATES PATENTS

| Number | Name | Date |
|---|---|---|
| 2,075,543 | Reed et al. | Mar. 30, 1937 |
| 2,256,625 | Quattlebaum, Jr. | Sept. 23, 1941 |
| 2,307,075 | Quattlebaum et al. | Jan. 5, 1943 |
| 2,344,002 | Rugeley et al. | Mar. 14, 1944 |